United States Patent [19]

Liu

[11] Patent Number: 4,466,024
[45] Date of Patent: Aug. 14, 1984

[54] TWO-SIDED USE OF FLOPPY DISKS

[75] Inventor: Peter D. Liu, Newton, Mass.

[73] Assignee: D/Punch Co., Newton Highlands, Mass.

[21] Appl. No.: 435,038

[22] Filed: Oct. 18, 1982

[51] Int. Cl.³ .......................... G11B 15/04; G11B 5/00
[52] U.S. Cl. ....................................... 360/60; 360/137
[58] Field of Search ................................. 360/60, 137

[56] References Cited

U.S. PATENT DOCUMENTS 4,003,088 1/1977 Schwartz ............................. 360/60

OTHER PUBLICATIONS

80 Microcomputing, pp. 140, 142 Richard Taylor 10/82.

Primary Examiner—Vincent P. Canney

[57] ABSTRACT

A reliable, fast, easily operated system for enabling the use of both sides of existing single-sided floppy diskette units involving creation of new disk-positioning (DP) holes centered at a pre-set location, so that the new holes bear the same spacial relationship to the disk-access slot on one side of the unit the original DP holes do to the disk access slot on the other side of the unit; the system includes a DP punch comprising a plunger and plate spaced from and cooperating with the plunger, and a positioning matrix to center the DP punch plunger over the appropriate pre-set location; the positioning matrix comprises a flat top section and a flat bottom section, which are joined along a portion of their perimeters to define a slot of sufficient length, depth and width to receive said unit therebetween; one edge of the top section defines a notch adapted to receive the disk-positioning punch, and the slot and notch are located, sized and shaped so that when the unit and a punch are fully inserted into the slot and notch respectively, the DP punch cannot readily be moved more than ⅛ inch in any direction with respect to the unit, and a portion of the DP punch plunger is over the pre-set location; the system also includes a write-protect punch and a spacer to position that punch.

20 Claims, 8 Drawing Figures

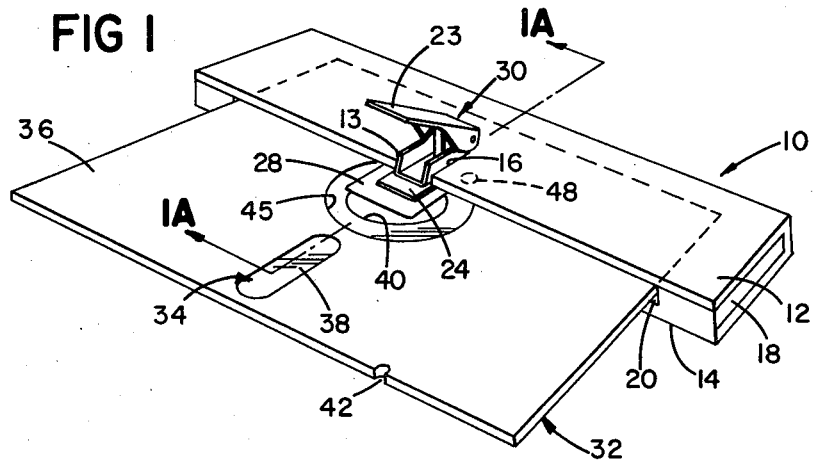
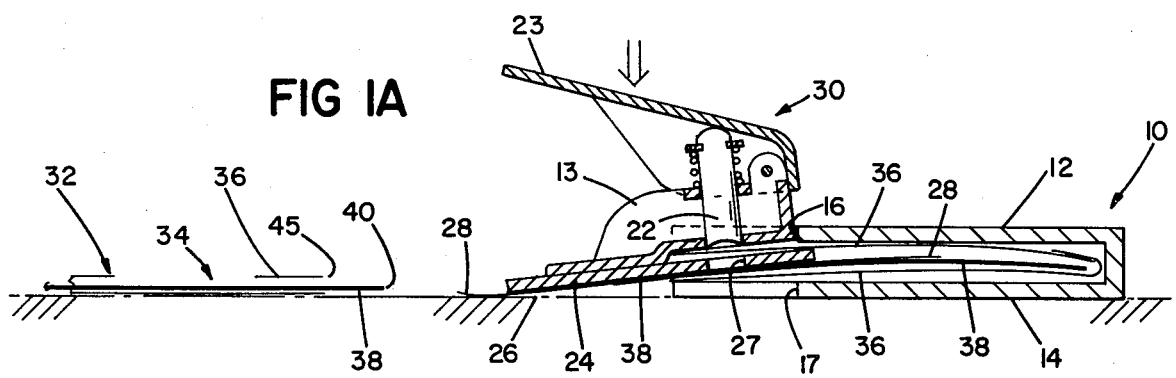
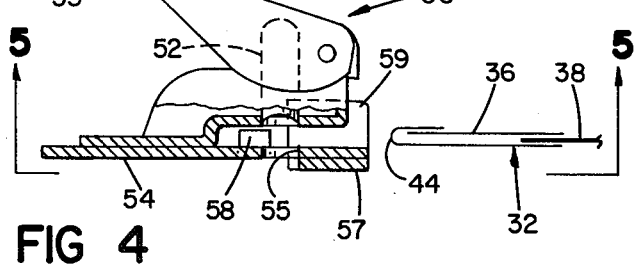
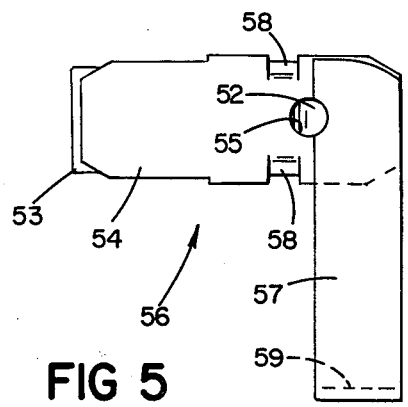
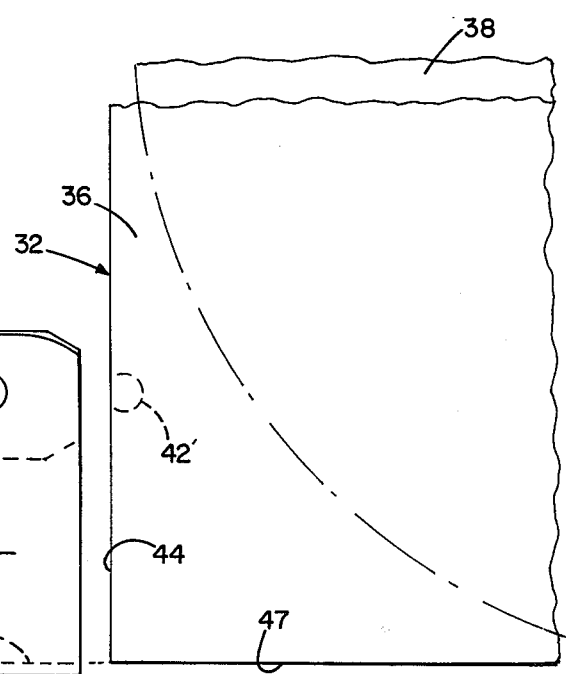

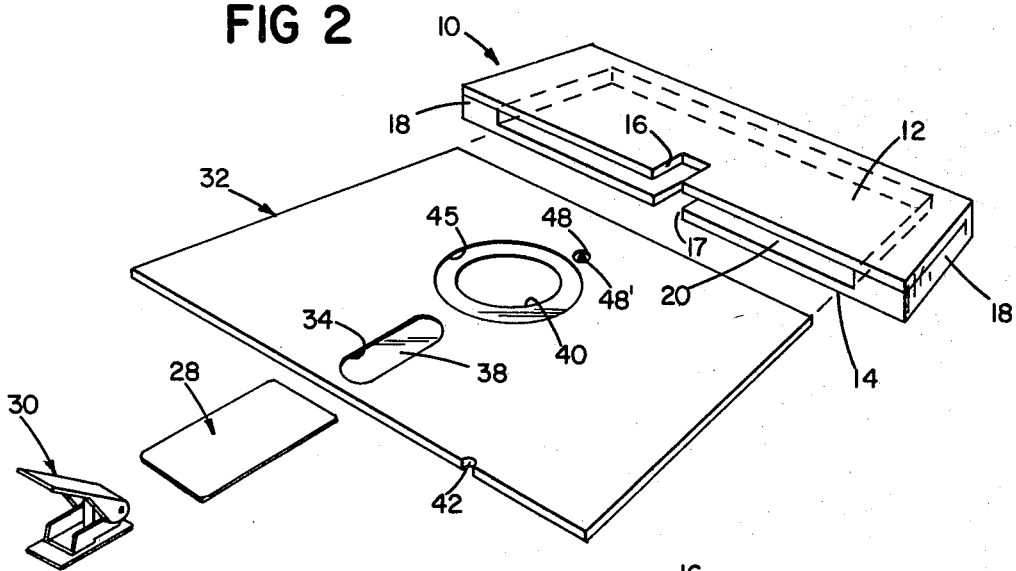
FIG 2
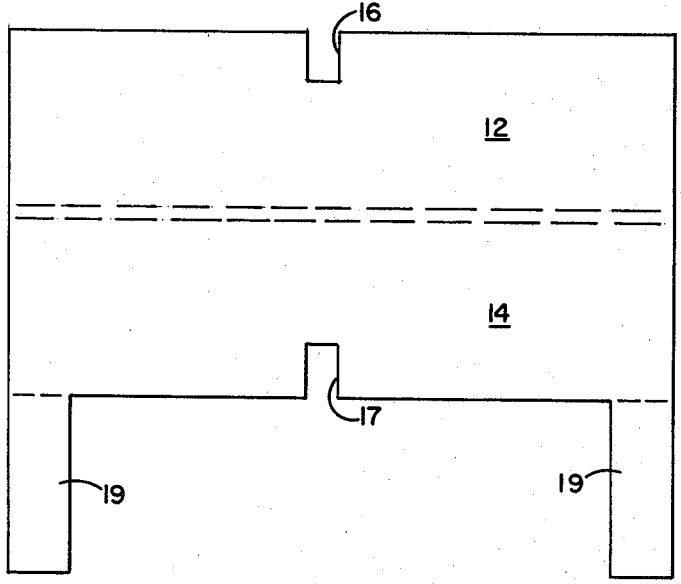
FIG 3
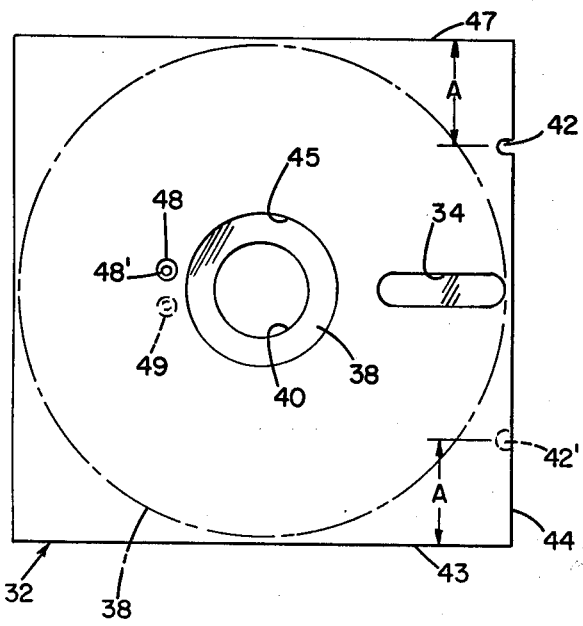
FIG 6
FIG 7

TWO-SIDED USE OF FLOPPY DISKS

BACKGROUND OF THE INVENTION

This invention relates to systems for preventing accidental erasure of, or writing over, computer program information stored on so-called floppy diskettes (called "write protecting" or WP) and for ensuring the proper frequency of disk rotation and the proper alignment and orientation of such diskettes in disk-drive apparatus (called "diskette-positioning" or "disk-positioning" or DP). Specifically, the invention concerns write-protection and disk-positioning systems that enable use of both sides of the floppy diskette.

Over the past decade, growth and development in the mini- and microcomputer field have been extraordinary; yet in most instances, only one side of the floppy diskettes used with such computers is available to store information, due to limitations imposed by the disk drive and its interaction with the write-protect and disk-positioning systems as described below.

Floppy diskette units consist of two parts, an extremely thin, round flexible disk coated with a magnetically responsive substance and a firm square permanent jacket that houses the disk. The jacket protects the disk and provides stiffness to enable insertion of the disk-/jacket unit into disk-drive equipment. As the disk is rotated rapidly within the stationary jacket, the disk-drive equipment records on and reads from one side of the disk through a jacket slot that extends over the active area of the disk.

The write-protect mechanism includes a notch in the one edge of the jacket which is sensed by the disk drive, for example by a spring-loaded pin that is blocked in the absence of the notch. Uncovering the notch allows the pin to extend through the notch and thereby trigger the write-protect function (or, in some systems, the write-enable function) on the disk drive. Covering the notch has the opposite effect.

For many, but not all, disk-drives, the system for disk positioning requires two small holes aligned on opposite sides of the disk jacket and, for soft-sector diskettes, one smaller corresponding hole in the disk, radially aligned with the jacket holes (hard-sector diskettes have multiple disk holes in a circle radially aligned with the jacket holes). A light source is positioned inside the disk drive on one side of the disk/jacket unit, and a sensor is aligned on the other side, so that, when the disk/jacket unit is correctly positioned and begins to rotate, the sensor periodically senses the light through the jacket and disk holes. If the unit is not properly positioned, it will block light from the sensor, and the disk drive will not read from or write on the disk; similarly, if the disk is not rotating at the proper frequency the disk drive will not transfer information to and from the disk.

Most disk-drive read and write devices are "single-sided"—that is, they interact with only one side of the inner disk—but both sides of the disk are coated with magnetic material, and both sides of the disk are accessible through slots in the jacket. For existing disks, correct orientation of the write-enable notch and the positioning holes will always present the same side of the disk to any given single-sided read and write apparatus.

Modification of a diskette to enable use of both sides is complicated by the fragile nature of the inner disk and the effect of pressure, abrasion, bending, foreign material, or magnetic fields on that disk. Extreme care must be used to avoid touching or bending the disk.

It is possible to make ad hoc modifications to the diskette to enable use of both sides as described in 80 *Microcomputing*, Oct., 1980, pp. 140–2. Specifically, that article shows a process in which holes or notches are outlined on the jacket using a traced flat pattern, and an ordinary punch is positioned by hand between the jacket and the disk to punch the marked holes. Such methods pose a significant danger of damaging the disk in that they may lead to substantial bending of the diskette, and they require inserting fingers or harmful foreign material between the disk and the jacket. Moreover, such methods are time-consuming, are not necessarily reliable, accurate or repeatable, and require a significant amount of care. Save for such methods, one side of the floppy disk has been virtually wasted for many years.

SUMMARY OF THE INVENTION

I have discovered a reliable, fast, easily operated system for enabling the use of both sides of existing floppy diskette units involving creation of a new write-protect notch at one pre-set location on the disk edge and creation of new disk-orientation holes centered at another pre-set location, so that the new notch and holes bear the same spacial relationship to the disk-access slot on one side of the unit as their respective original counterparts do to the disk access slot on the other side of the unit. With regard to the disk-positioning holes, the system includes a disk-positioning ("DP") punch comprising a plunger and a plate spaced from and cooperating with said plunger, and a positioning matrix to center the DP punch plunger over the appropriate pre-set location; the positioning matrix comprises a flat top section and a flat bottom section, joined along a portion of their perimeters to define a slot of sufficient length, depth and width to receive said unit therebetween; one edge of said top section defines a notch adapted to receive the disk-positioning punch, and the slot and notch are located, sized and shaped so that when the unit and punch are fully inserted into the slot and notch respectively, the DP punch cannot readily be moved more than $\frac{1}{8}$ inch in any direction with respect to the unit, and a portion of the DP punch plunger is over the appropriate pre-set location.

In another embodiment, the two DP positioning matrix sections are rectangular and are joined along three sides of their respective perimeters, and the edge of the bottom section defines a notch directly beneath, and the same size as, the notch in the top section edge. With regard to creating a new write-protect notch, the system includes a write-protect ("WP") punch comprising a plunger and a plate cooperating with and spaced from the plunger to receive an edge of the jacket therebetween, and a positioning means to position the WP punch over a pre-set location on the edge of the jacket; the positioning means comprises a spacer of a pre-established dimension corresponding to the distance between a reference point on the jacket and the pre-set location, and the WP punch has a means for stopping insertion of the jacket edge between the WP plunger and the WP plate when the pre-set location has traversed no more than ninety percent of the width of the area directly beneath the plunger.

Preferably, the system has a lint-free, non-abrasive barrier to be inserted between the disk-positioning punch plate and the upper side of the disk; the DP punch includes a support adapted to guide the plunger, the support being positioned above the DP plate, and the matrix notch being narrower than the plate and accommodating the support with a snug fit; the DP punch plate is less than ½ inch thick; the top and bottom sections of the DP positioning means are at least 1/16 inch thick; the DP punch plate terminates at one end in the central disk aperture, so that, when the system is supported on a hard surface, downward force on the punch is opposed by contact between the punch plate and the hard surface; the write-protect notches are either both on the leading edge of the disk, or they are on the top and bottom edges of the disk, respectively; the reference point for the WP punch positioning means is on an edge of the disk jacket; and the spacer is attached to the WP punch.

DESCRIPTION OF THE PREFERRED EMBODIMENT

I turn now to the structure and operation of the preferred embodiments, first briefly describing the drawings thereof.

FIG. 1 is a view of components of the disk-positioning system in place to be used according to the present invention.

FIG. 1A is a cross-section taken along 1A—1A of FIG. 1.

FIG. 2 is an exploded view of the components shown in FIG. 1.

FIG. 3 is a view of the sheet from which the positioning-matrix of FIG. 2 is manufactured.

FIG. 4 is a view of a write-protect punch.

FIG. 5 is a view taken from 5—5 of FIG. 4.

FIG. 6 is a standard single-sided 8-inch floppy disk-/jacket unit showing with dotted lines the modifications made according to the present invention.

FIG. 7 is a standard, single-sided 5¼-inch disk/jacket unit showing with dotted lines the modifications according to the invention.

I. DISK POSITIONING SYSTEM

A. Structure

As used herein, the term disk-positioning refers to ensuring the proper orientation and positioning of the diskette, as well as ensuring the proper frequency of disk rotation, as described in the Background section, above. Not all disk-drive systems have such a disk-positioning feature, and the description below applies only to disks to be used in apparatus with such a feature. FIGS. 1 and 1A show various elements of the disk-positioning system of the invention in place for modifying a conventional single-sided eight-inch disk to enable use of both sides of the disk. Disk unit 32 is positioned in the slot 20 of positioning-matrix 10. Support 13 of disk-positioning punch (DP punch) 30 is positioned in notch 16 of positioning-matrix 10; base plate 24 is below face 12, and jacket 36 is lies between plunger 22 and base plate 24. Barrier 28 lies under plate 24, between the plate and inner disk 38.

FIG. 2 shows the components of FIG. 1 in an exploded view. Positioning-matrix 10 consists of a top face 12 and a bottom face 14 which are spaced apart by two spacers 18 to form a slot 20 which is slightly wider (about 1/16 inch) than disk 32. The slot is about 2 13/16 inches deep, and spacers 18 are disposed on either side of the slot. Faces 12 and 14 each have a ⅝ inch square notch, which are aligned and start 4½ inches from the edge of the positioning-matrix.

DP punch 30 has a base plate 24 (Fig. 1A) about 1¾ inches long and 13/16 inches wide. Plunger 22 of the DP punch is circular in cross section, approximately ¼ inches in diameter with a concave cutting face. DP punch handle 23 is hinged in the front of the punch ahead of plunger 22, and plunger 22 is spring-biased against handle 23. Support 13 guides plunger 22 and is about 21/32 inches wide. Plate 24 has a circular opening 27 to accommodate plunger 22.

Barrier 28 is a thin piece of non-abrasive, lint-free material and should not generate any charged particles, sulfides or acids; for example the barrier may be Tyvek (E. I. DuPont, Wilmington, Del.) a continuous-fiber, spun-bonded olefin material that has been pulped with resin or oil and is made without fiber binders or coating. Barrier 28 is slightly longer and wider than base 24, for example 1 inch by 5 inches, with rounded corners to ease sliding between the disk and the jacket.

Floppy disk unit 32 is best shown in FIG. 6. It is composed of a circular inner disk 38 having a central aperture 40, and an 8 inch square jacket 36 surrounding disk 38. Jacket 36 is a plastic, e.g. polyvinyl chloride, lined with a lint-free, non-abrasive surface. Jacket 36 defines access slots 34 (only one is shown) aligned on either side of disk 38. Unit 32 has a write-protect notch 42 on the leading jacket edge 44, (that is, the first edge to be inserted into the disk drive) about 1¾ inches from top edge 47. Disk-positioning hole 48 is about 3/32 inches in diameter centered in a spot about 2 9/16 inches from the top edge 47. Jacket 36 has a central aperture 45 concentric with, and about 7/16 inches larger in diameter than the central disk aperture 40.

B. Manufacture of the Positioning-matrix

As shown in FIG. 3, positioning-matrix 10 is constructed from a single sheet of white B flute cardboard (200 test puncture strength, ⅛ inch thick). The cardboard sheet is cut to the form shown in FIG. 3, a rectangle 10 1/16 by 5⅞ inches, having extensions 19. Notches 16 and 17, ⅝ inches square are cut in both faces at a distance of 4½ inches from the edge. Fold lines ¼ inch apart are scored in the sheet at a distance of 2 13/16 inches from the top and bottom respectively. Spacers 18 are formed by extensions 19, 1 inch wide and 2 11/16 inches long, extending from the rectangular sheet as shown in FIG. 3. To form the positioning-matrix, the sheet is folded along the score lines so that extensions 19 are placed between the top face and the bottom face and secured therebetween.

C. Operation

As shown in FIG. 1, disk unit 32 is inserted into the slot of positioning-matrix 10 and fits there snuggly. DP punch 30 is positioned in notch 16 of positioning-matrix 10 by sliding barrier 28 between disk 38 and jacket 36 and then sliding plate 24 between barrier 28 and jacket 36, with jacket 36 sliding between plunger 22 and plate 24. Since support 13 is slightly (about 1/32 inch) wider than notch 16, the support will spread the notch and fit snugly therein. To avoid bending the disk to accomodate plate 24, the thickness of plate 24 should be no more than ⅛ inch, and is preferably less than that, e.g. 1/16 inch. The fit of the punch and diskette unit in positioning-matrix 10 must be sufficiently snug so that unit 32 does not readily move (i.e., with the application of force ordinarily experienced in handling the system components) more than 3/16 inches in any direction with respect to DP punch 30; and preferably the snugness does not allow movement of ⅛ inch in any direction. The thickness of the positioning-matrix will aid in preventing such movement. While the thickness necessary depends in part on the fit of the parts and the stiffness of the positioning-matrix material, it is preferable to have a positioning-matrix material of at least 1/16 inch, and preferably ⅛ inch, in order to ensure stability when using a cardboard positioning-matrix.

When support 13 of punch 30 is positioned in notch 16, the center of plunger 22 is about 2 9/16 from trailing edge 46 and about 4 3/16 inches from top edge 47. Because of the thickness of bottom face 14, plate 24 is supported in the middle in part by notch edge 17, and, when the positioning matrix is horizontal, plate 24 rests at a slight angle with respect to the vertical. The length of base 24 is such that it terminates and rests in apertures 45 and 40, against support surface 26. A bottom face thickness of at least 1/16 inch is satisfactory in this regard.

A firm downward force on handle 23 of punch 30 causes plunger 22 to punch through jacket 36 and into hole 27 in plate 24, cutting a smooth circular piece from the jacket. The force on handle 23 is opposed by support surface 26. Any force is exerted onto that portion of barrier 28 which lies over disk 38 involves the inner periphery of the disk which is not part of the active area of the disk. The newly positioned disk-positioning hole 49 is shown in FIG. 7 by dotted lines. With the unit still in the positioning matrix, both are turned over, and a similar hole is punched on the opposite side of unit 32 aligned with hole 49 to complete the disk-positioning process.

II. WRITE PROTECTION

A. Structure

For eight-inch diskettes, the presence of a write-protect slot (42 in FIG. 6) prevents the disk drive from writing on the disk. If there is no notch, or the notch is taped over, then it is possible to write on the disk. The system described below enables use of both sides of a diskette with such a write-protect notch.

FIGS. 4 and 5 show write-protect punch 56 which is similar to DP punch 30 in that it has a handle 53, and a plunger 52, and a plate 54 with a hole 55 therein to accommodate plunger 52. The dimensions of WP punch 56 are similar to those of DP punch 30. However, there are some important differences. The space between plunger 52 and plate 54 on punch 56 is wide enough to accommodate the edge of a unit such as unit 32. Since such units are formed by folding over jacket 36 at the edge, there may be three thicknesses of the jacket material at the edge in addition to the thickness of the disk and the lining material. A space of for example ⅛ inch is ordinarily enough to accommodate this thickness. Two square ears 58 formed from an integral part of plate 54 extend upwardly into the space between plate 54 and plunger 52. WP punch 56 also has a horizontal spacer 57 attached to plate 54 which terminates in an upwardly extending guide 59, attached at right angles to spacer 57. Distance A between the top edge 47 of unit 32 and the center of write protect slot 42 is approximately 1 23/32 inches and correponds to the distance between the center of hole 55 and the inside edge of guide 59.

B. Operation

The write protect punch 56 is properly located by inserting the leading edge 44 of unit 32 between plunger 52 and plate 54 until it is stopped by ears 58, and by aligning the bottom edge 43 of the unit against the inside edge of guide 59 of spacer 57. Exerting force on the handle 53 of WP punch 56 pushes plunger 52 through the portion of the jacket beneath the plunger and into the hole 55 in the base 54, cutting that portion of the jacket.

The WP punch is designed so that it extends over the jacket a sufficient distance to activate the write-protect mechanism (e.g. at least 3/32 of an inch and preferably 3/16″), but not so far as to jeopardize the inner disk, which, due to its circular shape, is not up flush with the jacket edge at this point. A distance of e.g. 9/16 of an inch (or 90% of the area directly beneath the plunger) will usually provide an adequate safeguard in this respect.

III. 5¼ Inch Disks

FIG. 7 shows a conventional single-sided 5¼ inch floppy disk unit 74. Most of the features of that disk are the same as the 8 inch disk shown in FIG. 6, but the write-protect and disk-positioning notches are located in different places. Moreover, the presence of the WP notch in a 5¼ inch diskette may have the opposite effect of that in the 8-inch diskette—i.e., with no notch (or with the notch taped over) the disk drive will not write on the disk. Thus, in order to write on the disk, a notch must be present.

As shown in FIG. 6, the mid-point of write-protect notch 70 is located in the top edge 72 of disk unit 74 approximately 1 5/16 inches from the trailing edge 75 of the disk housing. The mid-point of disk positioning hole 76 is located approximately 2⅜ inches from the leading edge 78 of the disk and 1⅝ inches from the top edge 72 of the disk unit. Accordingly, the modified write-protect and disk-locating holes must be made as indicated by the dotted lines in FIG. 7.

The system for accomplishing that is similar to the system described above. Disk positioning punch 30 is the same. The positioning-matrix is conceptually the same, but has different dimensions to accommodate the smaller disk, and the notch is located to correspond to the disk-positioning hole for 5¼ inch disks. The rectangle for the positioning matrix is 3¾ inches by 7 5/16 inches. The notch is ½ inches deep and ⅝ inches wide. The notch begins 3⅛ inches from the edge of the rectangle, and the spacers are 1 inch wide. The WP punch is the same, but the width of the WP spacer is a less—about 1 5/16 inches.

OTHER EMBODIMENTS

Other embodiments are within the following claims. By way of example only, the claimed system may be used with both single density and double density diskettes; it may be used with both hard-sector and soft-sector diskettes and it may be used with diskettes intended for use with a single-sided read/write apparatus, as well as diskettes that may be used with apparatus that reads from and writes on both sides of the disk at once.

The WP function may be performed using a spacer (e.g. of chip board) having parallel sides spaced apart the appropriate distance for positioning the WP punch. In that case, the spacer is used to make a pencil line on the disk jacket, and the WP punch includes a mark on the bottom of the plate, which is an extension of a radius of the circular hole in the plate, extending parallel to the plate sides. Aligning that mark with the pencil line ensures proper placement of the punch.

I claim:

1. A system for enabling the use of both sides of a conventional floppy disk/jacket unit, said unit jacket defining a first access slot to one side of said disk and a second access slot to the opposite side of said disk, said jacket further defining disk-positioning ("DP") apertures through said jacket, said disk-positioning apertures being aligned on opposite sides of said disk and centered at a first pre-set location, and said jacket still further defining a write-protect ("WP") notch at a second pre-set location on an edge of said jacket, said system comprising, (A) for creating new disk-postioning apertures,
   a disk-positioning ("DP") punch comprising a plunger and a plate spaced from and cooperating with said plunger, and
   a positioning matrix to center said DP punch plunger over a third pre-set location
      said third pre-set location bearing the same spacial relationship to said second access slot as said first pre-set location does to said first access slot,
      said positioning matrix comprising a flat top section and a flat bottom section, said top section being joined along a portion of its perimeter to the perimeter of said bottom section to define a slot of sufficient length, depth and width to receive said unit therebetween,
      one edge of said top section defining a DP notch adapted to receive said DP punch,
      said slot and said notch being located, sized and shaped so that when said unit and said DP punch are fully inserted into said slot and said notch respectively, said DP punch cannot readily be moved more than ⅛ inch in any direction with respect to said unit, and a portion of said DP punch plunger is over said third pre-set location, and (B) for creating a new write-protection notch,
   a write-protect ("WP") punch comprising a plunger and a plate cooperating with and spaced from said plunger to receive an edge of said jacket therebetween, and
   a positioning means to position said WP punch over a fourth pre-set location on the edge of said jacket,
      said fourth pre-set location bearing the same spacial relationship to said second access slot as said second pre-set location does to said first access slot,
      said positioning means comprising a spacer of a pre-established dimension corresponding to the distance between a reference point on said jacket and said fourth pre-set location,
      said WP punch comprising a means for stopping insertion of said jacket edge between said WP plunger and said WP plate when said fourth pre-set location has traversed no more than ninety percent of the width of the area directly beneath said plunger.

2. The system of claim 1 wherein said system includes a lint-free, non-abrasive barrier adapted to fit between said DP punch plate and said disk.

3. The system of claim 1 wherein said plate of said DP punch is less than ⅛ inch thick.

4. The system of claim 1 wherein said top section of said positioning matrix is at least 1/16 inch thick.

5. The system of claim 1 wherein said disk defines a central aperture, said bottom section of said positioning matrix is at least 1/16 inch thick, and, when said DP punch is positioned in said matrix to center said plunger over said third pre-set location and said positioning matrix is supported on a hard surface, said DP punch plate terminates at one end in a central disk aperture, so that downward force on said punch is opposed primarily by contact between said punch plate and said hard surface.

6. The system of claim 1 wherein said positioning matrix top and bottom sections are rectangular, said top section being joined along three sides of its perimeter to the corresponding three sides of the perimeter of said bottom section, one edge of said bottom section defining a notch adapted to receive said DP punch.

7. The system of claim 1 wherein said DP punch includes a support adapted to guide said DP plunger, said support being positioned above said DP plate, said notch being narrower than said plate, and said notch accommodating said support with a snug fit.

8. The system of claim 1 wherein said second pre-set location and said fourth pre-set location are on the leading edge of said jacket.

9. The system of claim 1 wherein said second pre-set location and said fourth pre-set location are on opposite edges of said jacket.

10. The system of claim 1 wherein said stop means on said WP punch is an ear, integral with said WP punch plate, stopping insertion of said unit into between said plunger and said plate when said plunger extends no more than 3/16 of an inch over said jacket.

11. The system claim 1 wherein said reference point is on an edge of said jacket perpendicular to the edge or which said fourth pre-set location is positioned.

12. The system of claim 1 wherein said WP spacer is attached to said WP punch.

13. A system for creating new disk-positioning apertures to enable the use of both sides of a conventional floppy disk/jacket unit, said unit jacket defining a first access slot to one side of said disk and a second access slot to the opposite side of said disk, said jacket further defining disk-positioning ("DP") apertures through said jacket, said disk-positioning apertures being aligned on opposite sides of said disk and centered at a first pre-set location, said system comprising,
   a disk-positioning ("DP") punch comprising a plunger and a plate spaced from and cooperating with said plunger, and
   a positioning matrix to center said DP punch plunger over a second pre-set location
      said second pre-set location bearing the same spacial relationship to said second access slot as said first pre-set location does to said first access slot,
      said positioning matrix comprising a flat top section and a flat bottom section, said top section being joined along a portion of its perimeter to the perimeter of said bottom section to define a slot of sufficient length, depth and width to receive said unit therebetween,
      one edge of said top section defining a DP notch to receive said disk-positioning punch,
      said slot and said DP notch being located, sized and shaped so that when said unit and said DP punch are fully inserted into said slot and said DP notch respectively, said DP punch cannot readily be moved more than ⅛ inch in any direction with respect to said unit, and a portion of said DP punch plunger is over said second pre-set location.

14. The system of claim 12 wherein said system includes a lint-free, non-abrasive barrier adapted to fit between said DP punch plate and said disk.

15. The system of claim 13 wherein said plate of said DP punch is less than ½ inch thick.

16. The system of claim 13 wherein said top section of said positioning matrix is at least 1/16 inch thick.

17. The system claim 13 wherein said disk defines a central aperture, said bottom section of said positioning matrix is at least 1/16 inch thick, and, when said DP punch is positioned in said matrix to center said plunger over said second pre-set location and said positioning matrix is supported on a hard surface, said DP punch plate terminates at one end in a central disk aperture, so that downward force on said punch is opposed primarily by contact between said punch plate and said hard surface.

18. The system of claim 13 wherein said DP punch includes a support adapted to guide said DP plunger, said support being positioned above said DP plate, said notch being narrower than said plate, and said notch accommodating said support with a snug fit.

19. A system for creating new disk-positioning holes to enable the use of both sides of a conventional floppy disk/jacket unit, said unit jacket defining a first access slot to one side of said disk and a second access slot to the opposite side of said disk, said jacket further defining disk-positioning ("DP") apertures through said jacket, said disk-positioning apertures being aligned on opposite sides of said disk and centered at a first pre-set location, said system comprising, a positioning matrix adapted to position a disk-positioning ("DP") punch having a plunger so that said DP punch plunger is centered over a second pre-set location said second pre-set location bearing the same spacial relationship to said second access slot as said first pre-set location does to said first access slot, said positioning matrix comprising a flat rectangular top section and a flat rectangular bottom section, said top section being positioned over said bottom section and said top section being joined along three sides of its perimeter to the corresponding three sides of the perimeter of said bottom section, said top and bottom sections defining a slot of sufficient length, depth and width to receive said unit therebetween, one edge of said top section defining a notch adapted to receive said disk-positioning punch, one edge of said bottom section defining a notch the same size as and directly beneath said slot in said edge of said top section, said slot being located, sized and shaped so that, when said unit is fully inserted into said slot, said unit cannot readily be moved with respect to said slot more than ⅛ of an inch in any direction, and said notches will be located over said second pre-set location.

20. A system for enabling the use of both sides of a conventional floppy disk/jacket unit, said unit jacket defining a first access slot to one side of said disk and a second access slot to the opposite side of said disk, said jacket still further defining a write-protect ("WP") notch at a first pre-set location on an edge of said jacket, said system comprising, a write-protect ("WP") punch comprising a plunger and a plate cooperating with and spaced from said plunger to receive an edge of said jacket therebetween, and a spacer to position said WP punch over a second pre-set location on the edge of said jacket, said second pre-set location bearing the same spacial relationship to said second access slot as said first pre-set location does to said first access slot, said spacer having a pre-established dimension corresponding to the distance between a reference point on said jacket and said second pre-set location, and said spacer being attached to said WP punch, said WP punch comprising a stop means stopping insertion of said jacket edge between said WP plunger and said WP plate when said second pre-set location has traversed no more than ninety percent of the width of the area directly beneath said plunger.

* * * * *

UNITED STATES PATENT OFFICE
CERTIFICATE OF CORRECTION

Patent No. 4,466,024                    Dated August 14, 1984

Inventor(s) Peter D. Liu

It is certified that error appears in the above-identified patent and that said Letters Patent are hereby corrected as shown below:

Title: "TWO-SIDED USE OF FLOPPY DISKS" should be --SYSTEM FOR ENABLING TWO-SIDED USE OF FLOPPY DISKS--, Col. 4, line 3 "about 1 3/4" should be --about 1 7/8--, Col. 6, line 48 "3 3/4" should be -- 3 7/8 --.

Signed and Sealed this

First Day of January 1985

[SEAL]

Attest:

GERALD J. MOSSINGHOFF

*Attesting Officer*     *Commissioner of Patents and Trademarks*